United States Patent
Chang et al.

(10) Patent No.: US 11,393,010 B1
(45) Date of Patent: Jul. 19, 2022

(54) OPERATING METHOD FOR ELECTRONIC APPARATUS FOR OFFERING ITEM INFORMATION AND ELECTRONIC APPARATUS SUPPORTING THEREOF

(71) Applicant: Coupang Corp., Seoul (KR)

(72) Inventors: Catherine Chang, Seoul (KR); Hye Young Cho, Seoul (KR); Seung Ho Jeong, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/236,894

(22) Filed: Apr. 21, 2021

(30) Foreign Application Priority Data

Mar. 30, 2021 (KR) .......................... 10-2021-0041011

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0282* (2013.01); *G06Q 30/0625* (2013.01); *G06Q 30/0633* (2013.01); *G06Q 30/0643* (2013.01)

(58) Field of Classification Search
CPC .......... G06Q 30/0631; G06Q 30/0282; G06Q 30/0625; G06Q 30/0633; G06Q 30/0643
See application file for complete search history.

(56) References Cited

U.S. PATENT DOCUMENTS

| | | | | |
|---|---|---|---|---|
| 7,664,669 | B1 * | 2/2010 | Adams | G06Q 30/0633 |
| | | | | 705/7.32 |
| 9,607,325 | B1 * | 3/2017 | Sriram | G06F 16/9535 |
| 10,002,371 | B1 * | 6/2018 | Baker | G06F 16/24578 |
| 10,332,161 | B2 * | 6/2019 | Flores | G06Q 30/0625 |
| 10,657,487 | B2 * | 5/2020 | Mueller | G06Q 10/0835 |
| 2006/0129446 | A1 * | 6/2006 | Ruhl | G06Q 30/0278 |
| | | | | 705/306 |
| 2007/0078670 | A1 | 4/2007 | Dave et al. | |

(Continued)

FOREIGN PATENT DOCUMENTS

| | | | |
|---|---|---|---|
| KR | 10-2001-0025294 A | 4/2001 | |
| KR | 10-2013-0011145 A | 1/2013 | |

(Continued)

OTHER PUBLICATIONS

Cao, Qing, Wenjing Duan, and Qiwei Gan. "Exploring determinants of voting for the "helpfulness" of online user reviews: A text mining approach." Decision Support Systems 50.2 (2011): 511-521. (Year: 2011).*

*Primary Examiner* — Matthew E Zimmerman
(74) *Attorney, Agent, or Firm* — Knobbe, Martens, Olson & Bear, LLP

(57) ABSTRACT

Provided is a method of offering item information by an electronic apparatus. The method includes acquiring keyword information from a user, confirming one or more items corresponding to the keyword information and including a first item, confirming characteristic information on the first item and information on a representative review including at least a part of text of one review selected from a plurality of reviews of the first item, and providing item list information for the one or more items including the characteristic information and the information on the representative review.

16 Claims, 8 Drawing Sheets

(56) References Cited

U.S. PATENT DOCUMENTS

| | | | |
|---|---|---|---|
| 2013/0254706 A1* | 9/2013 | Gibbons | G06F 3/048 |
| | | | 715/784 |
| 2014/0316930 A1* | 10/2014 | Jain | G06Q 30/0631 |
| | | | 705/26.5 |
| 2015/0058180 A1* | 2/2015 | Nations | G06Q 30/0282 |
| | | | 705/27.2 |
| 2016/0048889 A1* | 2/2016 | Wachsberg | G06Q 30/0276 |
| | | | 705/14.16 |
| 2020/0020000 A1* | 1/2020 | Guy | G06Q 30/0282 |
| 2020/0065878 A1* | 2/2020 | Stubbs | G06F 16/9535 |
| 2021/0065098 A1 | 3/2021 | Park et al. | |

FOREIGN PATENT DOCUMENTS

| | | |
|---|---|---|
| KR | 10-1498001 B1 | 3/2015 |
| KR | 10-1500849 B1 | 3/2015 |
| KR | 10-1756594 B1 | 7/2017 |
| KR | 10-2019-0001893 A | 1/2019 |
| KR | 10-2135674 B1 | 8/2020 |
| KR | 10-2020-0113538 A | 10/2020 |
| KR | 10-2174717 B1 | 11/2020 |
| KR | 10-2021-0025250 A | 3/2021 |
| KR | 10-2021-0028032 A | 3/2021 |

\* cited by examiner (a)

(b)

(c)

(a)

(b)

(a)

(b)

(c)

OPERATING METHOD FOR ELECTRONIC APPARATUS FOR OFFERING ITEM INFORMATION AND ELECTRONIC APPARATUS SUPPORTING THEREOF

BACKGROUND

Technical Field

The present disclosure relates to a method and apparatus for offering item information, and more particularly, to a method of offering information on purchase characteristics of an item and a representative review for an item, and an electronic device therefor.

Description of the Related Art

With the development of electronic technology, e-commerce has become a field of shopping. Customers may purchase items online without going to shopping malls or markets directly, and the items purchased online are delivered to delivery destinations requested by the customers.

In the case of the e-commerce, provision of detailed and accurate information on or regarding products has a significant effect on service satisfaction, and thus, discussions about various methods of offering the more detailed and accurate information are being made.

In this regard, related prior art documents such as KR101756594B1 or KR101500849B1 may be referred to.

SUMMARY

Technical Goals

An aspect provides an electronic apparatus for offering item information that provides information on purchase characteristics of an item and a representative review on the item together to promote user's purchase convenience.

The technical goals to be achieved by the present disclosure are not limited to the technical goals described above, and other technical goals that are not described may be clearly understood by those with ordinary knowledge in the technical field to which the present disclosure belongs from the following description.

Technical Solutions

Various example embodiments may provide a method of operating an electronic apparatus for offering item information and an electronic apparatus for supporting the same.

According to an aspect, there is provided a method of providing item information by an electronic apparatus, the method including acquiring, from a user, keyword information, confirming one or more items corresponding to the keyword information and including a first item, confirming characteristic information on or regarding the first item and information on a representative review including at least a part of text of one review selected from a plurality of reviews of the first item, and providing item list information for the one or more items including the characteristic information and the information on the representative review.

The information on the representative review may include a title text of the selected one review, and the selected one review may be a review with a highest ranking in reviews in which a title is listed among the plurality of reviews.

The selected one review may be a review included in a review set selected from the plurality of reviews, and the selected review set may be determined based on evaluation and the number of clicks for the plurality of reviews by a plurality of users.

The method may further include confirming an item corresponding to a specific attribute among the one or more items, in which the item list information may include an icon for indicating the specific attribute displayed at a location related to the item corresponding to the specific attribute.

The specific attribute may include an attribute in which a corresponding item is recommended for the user according to a purchase history of the user.

The specific attribute may include an attribute in which a corresponding item has a high purchase rate among the one or more items.

The specific attribute may include an attribute in which a corresponding item has a highest purchase rate among the one or more items.

The specific attribute may include an attribute in which a corresponding item is purchasable when reserved by the user in advance.

The method may further include confirming an item with a purchase history of the user among the one or more items, in which the item list information may include an icon for indicating the purchase history displayed at a location related to the item with the purchase history.

The purchase history may indicate that the user has a purchase history of once or twice when a corresponding item is an item purchased once or twice by the user and may indicate that there is a repeated purchase history by the user when a corresponding item is an item that the user has purchased three or more times.

The characteristic information may include information on a delivery completion deadline of the first item, and the information on the delivery completion deadline may be displayed as an icon when the delivery completion deadline is before a reference time point and may be displayed as text when the delivery completion deadline is after the reference time point.

The reference time point may be a time point within one day from a purchase date of the first item.

The information on the delivery completion deadline may includes information on a time period in which the delivery of the first item is enabled to be completed, and the information on the time period in which the delivery is enabled to be completed may be displayed by being included in the icon based on the delivery completion deadline being before the reference time point.

The information on the representative review may include rating information on the first item.

According to another aspect, there is provided an electronic apparatus for providing item information, the electronic apparatus including a processor and one or more memories that store one or more instructions, in which when the one or more instructions are executed, the processor may be controlled to perform: acquiring, from a user, keyword information; confirming one or more items corresponding to the keyword information and including a first item; confirming characteristic information on the first item and information on a representative review including at least a part of text of one review selected from a plurality of reviews of the first item; and providing item list information for the one or more items including the characteristic information and the information on the representative review.

According to still another aspect, there is provided a user apparatus for outputting item information, the user apparatus including a processor and one or more memories that store one or more instructions, in which when the one or more instructions are executed, the processor may control to perform: transmitting, to a server device, keyword information acquired from a user; receiving, from the server device, information related to one or more items including a first item in response to the keyword information; receiving, from the server device, characteristic information on the first item and information on a representative review including at least a part of text of one review selected from a plurality of reviews of the first item; and outputting item list information for the one or more items including the characteristic information and the information on the representative review.

Various example embodiments of the present disclosure described above are only some of example embodiments of the present disclosure, and various example embodiments reflecting technical characteristics of various example embodiments of the present disclosure may be derived and understood based on the detailed description to be described below by those of ordinary skill in the art.

Effects

According to the present disclosure, it is possible to provide a method of offering characteristic information on an item and a title of a representative review having a high rating for the item when providing item information to provide information reflecting more accurate user evaluation.

Effects that may be achieved by the present disclosure are not limited to the above-described effects, and other effects that are not described will be clearly understood by those skilled in the art from the description of the scope of the claims.

DETAILED DESCRIPTION

The following example embodiments are combinations of components and features of various example embodiments in a certain form. It may be considered that the respective components or features are selective unless separately and explicitly described. The respective components or features may be implemented in a form in which they are not combined with other components or features. In addition, various example embodiments may be configured by combining some components and features. An order of operations described in various example embodiments may be changed. Some configurations or features of any example embodiment may be included in other example embodiments or may be replaced with corresponding configurations or features of other example embodiments.

In the description of the drawings, procedures, operations, and the like that may obscure the gist of various example embodiments are not described, and procedures or operations that may be understood at the level of those of ordinary skill in the art are also not described.

Throughout the present specification, unless explicitly described to the contrary, "comprising or including" any components will be understood to imply the inclusion of other elements rather than the exclusion of any other elements. A term " . . . unit," " . . . er/or," "module," or the like, described in the specification means a processing unit of at least one function or operation and may be implemented as hardware or software or a combination of hardware and software. In addition, unless otherwise indicated or plainly contradicted by context, "a or an," "one," "the," and similar related terms may be used in a sense including both the singular and the plural in the context of describing various example embodiments (in particular, in the context of the following claims).

Hereinafter, example embodiments according to various example embodiments according to the present disclosure will be described in detail with reference to the accompanying drawings. The detailed description to be disclosed below in conjunction with the accompanying drawings is intended to describe exemplary examples of various example embodiments and is not intended to represent only one example.

In addition, specific terms used in various example embodiments are provided to aid understanding of various example embodiments, and the use of these specific terms may be changed into other forms without departing from the technical idea of various example embodiments.

Figure 1:
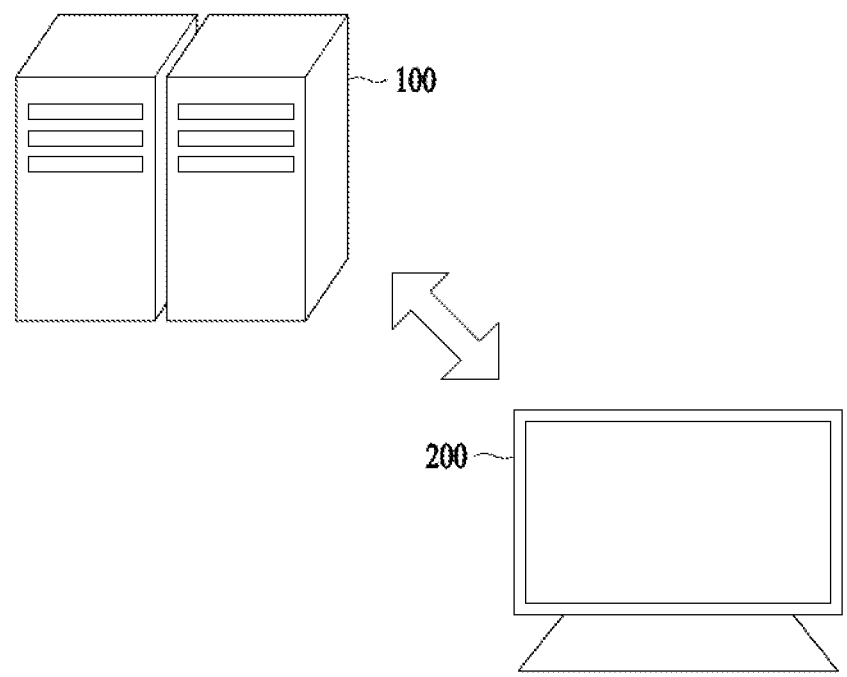
FIG. 1 is a diagram illustrating a system for offering item information in which a method of operating an electronic apparatus for offering item information may be implemented according to various example embodiments.

FIG. 1 is a diagram for describing a system for offering item information in which a method of operating an electronic apparatus for offering item information may be implemented according to various example embodiments.

Referring to FIG. 1, the system for offering item information according to various example embodiments may be implemented in various types of electronic apparatuses. For example, the system for offering item information may be implemented in a server device 100 and/or a user device 200. In other words, the server device 100 and/or the user device 200 may perform operations according to various example embodiments of the present disclosure based on the system for offering item information implemented in each device. Meanwhile, the system for offering item information according to various example embodiments is not limited to one illustrated in FIG. 1 and may be implemented in more various electronic apparatuses and servers.

The server device 100 according to various example embodiments may be a device that performs wireless and/or wired communication with a plurality of user devices 200 and includes a storage having a large storage capacity. For example, the server device 100 may be a cloud device that links with a plurality of user devices.

The user device 200 according to various example embodiments may be a device that may be used by an individual user, such as a desktop personal computer (PC), a tablet PC, or a mobile terminal. In addition, other electronic apparatuses performing similar functions may be used as the user device 200.

The system for offering item information according to various example embodiments may include various modules for operations. The modules included in the system for offering item information may be a computer code to one or more instructions implemented to perform specified operations by a physical device (for example, the server device 100 and/or the user device 200) on which the system for offering item information is implemented (or included in the physical device). In other words, the physical device in which the system for offering item information is implemented may store a plurality of modules in a memory in the form of the computer code, and when the plurality of modules stored in the memory are executed, the plurality of modules may cause the physical device to perform specified operations corresponding to the plurality of modules.

Figure 2:
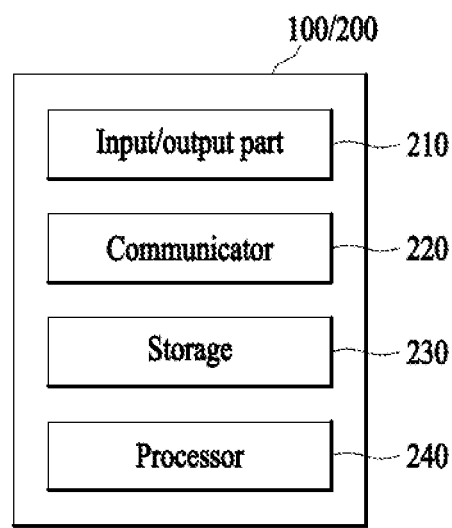
FIG. 2 is a diagram illustrating configurations of a server device and/or a user device according to various example embodiments.

FIG. 2 is a diagram illustrating a configuration of the server device 100 and/or the user device 200 according to various example embodiments.

Referring to FIG. 2, the server device 100 and/or the user device 200 may include an input/output part 210, a communicator 220, a storage 230, and a processor 240.

The input/output part 210 may be any type of an interface, a connection port, or the like that receive a user input or output information to a user. The input/output part 210 may include an input module and an output module, wherein the input module receives the user input from the user. The user input may be performed in various forms including a key input, a touch input, and a voice input. Examples of the input modules that may receive the user input may include not only a traditional type of keypad, keyboard, and mouse, but also a touch sensor that detects a user's touch, a microphone that receives a voice signal, a camera that recognizes gestures or the like through image recognition, a proximity sensor that includes at least one of an illuminance sensor or an infrared sensor that detects user approach, a motion sensor that recognizes user motion through an acceleration sensor, a gyro sensor, or the like, and various types of input devices that detect or receive various types of user inputs. The input module according to the example embodiment of the present disclosure may include at least one of the devices listed above. Here, the touch sensor may be implemented as a piezoelectric or capacitive touch sensor that detects a touch through a touch panel or a touch film attached to a display panel, an optical touch sensor that detects a touch in an optical manner, or the like. In addition, the input module may be implemented in the form of input interfaces (universal serial bus (USB) port, PS/2 port, and the like) that connects external input devices that receive the user input instead of a device that detects the user input by itself.

Further, the output module may output various pieces of information. The output module may include at least one of a display on which an image is output, a speaker through which a sound is output, a haptic device that generates vibrations, and other various types of output devices. In addition, the output module may be implemented in the form of a port type output interface that connects the individual output devices described above.

As an example, the output module in the form of the display may display text, still images, and moving images. The display may include at least one of a liquid crystal display (LCD), a light emitting diode (LED) display, an organic light emitting diode (OLED) display, a flat panel display (FPD), a transparent display, a curved display, a flexible display, a three-dimensional (3D) display, a holographic display, a projector, and various types of other devices capable of performing a video output function. Such a display may be implemented in the form of a touch display integrated with the touch sensor of the input module.

The communicator 220 may communicate with other devices. Therefore, the server device 100 and the user device 200 may transmit and receive information to and from other devices through the communicator. For example, the server device 100 and the user device 200 may communicate with each other using the communicator or may communicate with other devices.

Here, the communication, that is, data transmission/reception, may be performed in a wired or wireless manner. To this end, the communicator may be constituted by a wired communication module that allows the Internet, or the like, to be accessed through a local area network (LAN), a mobile communication module that allows a mobile communication network to be accessed via a mobile communication base station to transmit and receive data, a short-range communication module that uses a wireless local area network (WLAN) based communication scheme such as wireless fidelity (Wi-Fi) or a wireless personal area network (WPAN) based communication scheme such as Bluetooth or ZigBee, a satellite communication module that uses a global navigation satellite system (GNSS) such as a global positioning system (GPS), or a combination thereof.

The storage 230 may store various pieces of information. The storage may temporarily or semi-permanently store data. For example, an operating program (OS) for driving the server device 100, data for hosting a web site, data related to programs or applications (for example, a web application) for creating Braille, or the like may be stored in the storage of the server device 100. In addition, the storage may store the modules in the form of the computer code as described above.

Examples of the storage 230 may include a hard disk drive (HDD), a solid state drive (SSD), a flash memory, a read-only memory (ROM), a random access memory (RAM), or the like. The storage may be provided in an embedded type or a detachable type.

The processor 240 controls the overall operation of the server device 100 and the user device 200. To this end, the processor 240 may perform calculations and processing of various pieces of information and control operations of components of the server device 100. For example, the processor 240 may execute programs or applications for offering item information. The processor 240 may be implemented as a computer or an apparatus similar to the computer depending on hardware, software, or a combination thereof. In hardware, the processor 240 may be implemented in the form of an electronic circuit that performs a control function by processing an electrical signal, and in software, the processor 240 may be implemented in the form of a program that drives the hardware processor 240. Meanwhile, in the following description, unless otherwise described, the operations of the server device 100 and the user device 200 may be interpreted as being performed under the control of the processor 240. That is, when the modules implemented in the above-described system for offering item information are executed, the modules may be interpreted as controlling the processor 240 to control the server device 100 and the user device 200 to perform the following operations.

In summary, various example embodiments may be implemented using various devices. For example, various example embodiments of the present disclosure may be implemented as hardware, firmware, software, a combination thereof, or the like.

When various example embodiments of the present disclosure are implemented as the hardware, a method according to various example embodiments may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

When various example embodiments of the present disclosure are implemented as the firmware or the software, the method according to various example embodiments of the present disclosure may be implemented in the form of a module, a procedure, a function, or the like that performs functions or operations described below. For example, software code may be stored in the memory and driven by the processor. The memory may be located inside or outside the processor and may transmit or receive data to or from the processor through various known devices.

Hereinafter, various example embodiments will be described in more detail based on the above technical idea. The contents described above may be applied to various example embodiments described below. For example, operations, functions, terms, and the like that are not defined in various example embodiments described below may be performed and described based on the above-described contents.

In the following description, various example embodiments will be described on the premise that the server device 100 performs an operation of offering item information, and according to various example embodiments, the user device 200 acquiring the item information from the server device 100 may output the item information.

Figure 3:
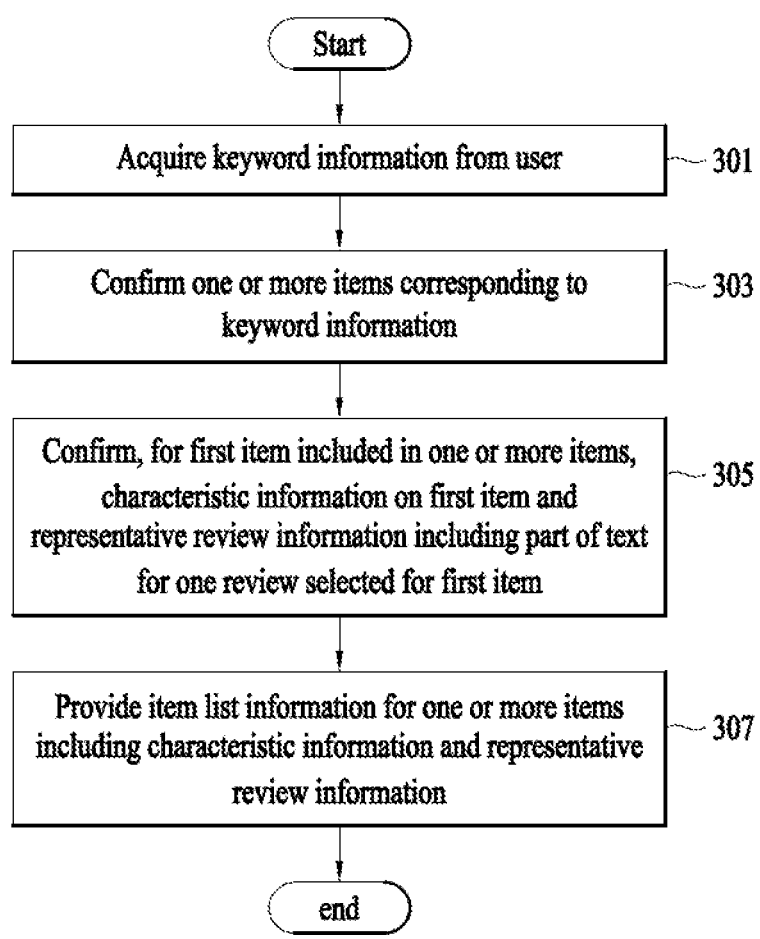
FIG. 3 is a diagram illustrating a method of operating an electronic apparatus for offering item information according to various example embodiments.

FIG. 3 is a diagram illustrating a method of operating an electronic apparatus for offering item information according to various example embodiments.

According to various example embodiments, in operation 301, the server device 100 may acquire keyword information related to the item from the user.

For example, the server device 100 may receive or acquire the keyword information input by the user through the user device 200.

For example, the server device 100 may search for an item based on the keyword information.

For example, the keyword information may be information on an item name of a product to which an item belongs, information on a category in which the item may be classified, and/or other pieces of text information that may indicate the item.

For example, the user may input the keyword information in a search area 401 of the user device 200, which will be described later in FIG. 4, and the server device 100 may receive and acquire the keyword information from the user device 200.

For example, the user device 200 may transmit the acquired keyword information to the server device 100 and then receive the item information to be provided to the user in relation to the keyword information from the server device 100.

According to various example embodiments, in operation 303, the server device 100 may confirm one or more items corresponding to the keyword information.

For example, one or more items corresponding to the keyword information may be confirmed as list information in the form of a list of items corresponding to the keyword information.

For example, one or more items corresponding to the keyword information may be information on one or more items corresponding to the item name as the keyword information includes information on the item name.

For example, one or more items corresponding to the keyword information may be information on one or more items corresponding to the category as the keyword information includes the information on the category.

For example, the server device 100 may transmit information for one or more items corresponding to the keyword information to the user device 200, and the user may confirm one or more items corresponding to the keyword information through an item list display area 403 of the user device 200 which will be described later in FIG. 4.

According to various example embodiments, in operation 305, the server device 100 may confirm characteristic information on a specific item included in one or more items and representative review information including a part of text for one review selected for the specific item.

For example, the characteristic information on the specific item may include a plurality of pieces of information on the purchase characteristics of the item, such as a name, an image, a use, a price, a discount rate, and/or return availability of the specific item.

For example, the server device 100 may confirm information on a specific review selected based on a certain criterion among at least some of reviews for the specific item as information on a representative review. That is, the information on the selected one review may be understood as the information on the representative review to which information is to be provided.

For example, at least some of the reviews for the specific item may each include rating information on the specific item.

For example, the rating information on the specific item included in at least some of the reviews for the specific item may be quantified and patterned information.

For example, the representative review information may include the rating information on the specific item corresponding to the selected one review.

For example, the review for the specific item may include information obtained by quantifying or patterning the evaluation of users for the specific item.

For example, the review for the specific item may include information on a photographed image after a plurality of users purchase the specific item.

For example, the selected review may be a review selected based on whether a title is listed in each review among the reviews for the specific item.

For example, the selected review may be a review having the best evaluation and the highest ranking for each review among at least some of the reviews for the specific item. In this case, the evaluation for each review may be performed by a plurality of users, and the ranking of each review may be determined based on the evaluation and the number of clicks by the plurality of users.

For example, the selected review may be primarily selected based on whether a title is listed in each review among at least some of the reviews for the specific item, and some reviews having good evaluation for each review or one review having the best evaluation among the reviews in which the title is listed may be selected again.

For example, the selected review may be a review included in a set of a certain number of reviews among the reviews of at least some of the reviews for the specific item, and the set of reviews may be a set of reviews determined based on the evaluation and the number of clicks by the plurality of users. Specifically, some reviews may be included in the set of reviews descending from the evaluation in which the plurality of users is high and the number of clicks is large, and any one of the reviews included in the set of reviews may also be determined as the selected one review.

For example, the selected review may be a review included in a set of a certain number of reviews among the reviews of at least some of the reviews for the specific item, and the set of reviews may be a set of reviews determined in response to the characteristics of the user. Specifically, the set of reviews may include a review written by a reviewer having characteristics of a similar age group or the same gender as a user in consideration of a user's age group, a user's gender, or the like.

For example, the selected review may be a review included in a set of a certain number of reviews among the reviews of at least some of the reviews for the specific item, and the set of reviews may be a set of reviews determined in response to a review having a history of being clicked by a user. Specifically, the set of reviews may include a review including words, terms, or keywords that are the same or similar to the review having the history of being clicked by the user. Alternatively, the reviews having the same or similar characteristics may be included in the set of reviews in consideration of whether an image of the review having the history of being clicked by the user is included, a length of text of the review having the history of being clicked by the user, or the like.

For example, the evaluation of at least some of the reviews for the specific item may be performed by a plurality of users, and the evaluation for at least some of the reviews for the specific item may include quantified or patterned information.

For example, when the number of reviews for the specific item is one, the one review may be confirmed as a specific review selected according to operation 305 regardless of whether a title is listed. That is, when the number of reviews for the specific item is one, the one review may be a review that is a target to be confirmed as the representative review information.

In this case, when the title of the one review is listed, at least a part of the text of the title of the one review may be confirmed as the representative review information. Alternatively, when the title of the one review is not listed, at least a part of text of a body of the one review may be confirmed as the representative review information.

When the one review is confirmed as the representative review according to the above-described embodiment in the state in which the number of reviews for the specific item is one, the server device 100 may additionally confirm the information notifying that the one review is an only review written for the specific item to determine that the one review is not selected from a plurality of reviews.

For example, when the number of reviews for the specific item is one, the one review may be confirmed as a representative review according to operation 305 regardless of the evaluation or ranking for the review. That is, when the number of reviews is one, the one review may be confirmed as the representative review without considering the evaluation or the ranking for the review.

For example, the server device 100 may select one review for which information is to be confirmed as long as the number of reviews of at least some of the reviews for the specific item is greater than or equal to a preconfigured number.

In this case, the preconfigured number to be a criterion for selecting one review may be absolutely determined as a general number. Alternatively, the preconfigured number, which is a criterion for selecting one review, may be relatively determined in consideration of the number of reviews for a plurality of other items belonging to a category in which the specific item is included. As an example, the preconfigured number, which is a criterion for selecting one review, may be determined as a value obtained by averaging the number of reviews for a plurality of other items belonging to a category in which the specific item is included. In this case, the server device 100 may select one review for which information is to be confirmed and confirm some texts included in the selected one review as the representative review information as long as the number of reviews of at least some of the reviews for the specific item is greater than or equal to the average number of reviews for a plurality of other items belonging to the category in which the specific item is included.

The operation of the server device 100 to confirm the characteristic information on or regarding the item according to operation 305 may further include confirming information according to example embodiments described below.

For example, the server device 100 may additionally confirm information related to sales of a specific item in addition to the characteristic information on the specific item. Here, the information related to the sales of the item may include: 1) information that may know the sales status or situation of the item or users' preference or purchase frequency, 2) additional information that users are to be aware of for the users to purchase an item, and/or 3) recommendation information or the like based on an algorithm that reflects the purchase characteristics of each user.

Specifically, when it is determined that an item that is a target about which information is to be transmitted shows a good sales status or situation due to a high purchase rate of users compared to other items for a certain period of time, or when a sales volume has increased sharply for a certain period of time, the server device 100 may additionally confirm information indicating the high purchase rate of the item.

For example, a certain period of time that is the basis for determining the purchase rate may be a preset period, such as a week, a month, or a quarter.

For example, the information indicating the high purchase rate of the item may be confirmed as text such as "popular product" or "popular lately."

For example, when it is determined that an item has the highest purchase rate and shows the best sales status or situation among items to which the item that is a target about which information is to be transmitted belongs, the information indicating the high purchase rate of the item may be confirmed as text such as "best seller" or "No. 1 in sales."

In this case, a determination as to whether the item has the highest purchase rate and shows the best sales status or sales status may be determined through an algorithm.

Here, various pieces of information for indicating that the item has a high purchase rate is not limited to the above-described phrase content or text form, and other phrase content or various other forms that may indicate that the item has a high purchase rate or shows a sales situation may be included.

Specifically, when there is a matter to be additionally confirmed by a user in order to purchase an item that is a target about which information is to be transmitted, the server device 100 may additionally confirm the information.

For example, when a user is to reserve an item in advance for the purchase of the item that is a target about which information is to be transmitted, additional information that users are to be aware of for the users to purchase items may be confirmed as text in the form of "advance reservation."

For example, when there is a possibility that the purchase of the item that is a target about which information is to be transmitted may be delayed due to delivery circumstances, the additional information that users are to be aware of for the users to purchase items may be confirmed as text in the form of the "delivery delay."

For example, when the purchase of the item that is a target about which information is to be transmitted is limited on the day of sale, the information that users are to be aware of for the users to purchase items may be confirmed as text in the form of the "same day delivery closed."

Here, various pieces of information for indicating matters that the user is to additionally confirm in order for the user to purchase the items is not limited to the above-described phrase content or text form and may include other phrase content or various other forms that may indicate additional guidance.

Specifically, when it is determined that the item being checked by the user is suitable by comparison with the existing purchase history characteristics of the user, the server device 100 may additionally confirm information notifying that the item is an item that may be recommended according to the purchase characteristics of the user.

For example, when the purchase rate for the item by other users with purchase history characteristics similar to the existing purchase history characteristics of the user is high, the information notifying that the item is the item that may be recommended according to the purchase characteristics of the user may be confirmed as text such as "customer suitability" or "algorithm recommendation."

The operation of the server device 100 to confirm the characteristic information on the item according to operation 305 may further include confirming information according to example embodiments described below.

For example, the server device 100 may additionally confirm the information on the purchase history of the user for the item in addition to the characteristic information on the item.

Specifically, when a user has purchased a product, that is a target about which information is to be transmitted, more than once, the server device 100 may additionally confirm information indicating the purchase history of the item.

For example, when a user has a history of purchasing the item once, the information indicating the purchase history of the item may be confirmed as text such as "product purchased once," when a user has a history of purchasing the item twice, the information indicating the purchase history of the item may be confirmed as text such as "product purchased twice," and when a user has a history of purchasing the item three or more times, the information indicating the purchase history of the item may be confirmed as text such as "frequently purchased product." Here, the display of the "frequently purchased product" is not text configured only when a user has a history of purchasing the product three or more times but may be text based on a predetermined number of purchases. In this case, the specific number of times may also include the number of purchases, such as once or twice, described above. In addition, the number of times the "frequently purchased product" is purchased may be counted by determining whether the same product has been repeatedly purchased based on an item identifier. Here, the item identifier is assigned to differentiate items, and even when items are sold by other sellers in a service managed by the server device 100, the same kind of items may be assigned the same item identifier.

As an example, the number of times a user has purchased an item may be counted for a specific period, and the specific period may be a preset period such as one month, a quarter, a half term, and one year.

The operation of the server device 100 to confirm the characteristic information on the item according to operation 305 may further include confirming information according to example embodiments described below.

For example, the server device 100 may additionally confirm the information on the delivery guarantee period of the item in addition to the characteristic information on the item.

Specifically, when it is possible to deliver an item that is a target about which information is to be transmitted to a user within a specific period or before a reference point, the server device 100 may additionally confirm information on the delivery completion guarantee period of the item.

For example, when a delivery period required when a user purchases an item that is a target about which information is to be transmitted is available within the day of purchase, the information on the delivery completion guarantee period of the item may be confirmed as text in the form of "guaranteed to arrive today", "guaranteed for same day delivery", "scheduled to arrive today" or "scheduled for same day delivery."

For example, when a delivery period required when a user purchases an item that is a target about which information is to be transmitted is available within the day after purchase, the information on the delivery completion guarantee period of the item may be confirmed as text in the form of "guaranteed to arrive tomorrow" or "scheduled to arrive tomorrow."

For example, when a delivery period required when a user purchases an item to which information is to be delivered is available until Tuesday, June 5, the information on the delivery guarantee period of the item may be confirmed as text in the form of "guaranteed to arrive by June 5 (Tuesday)" or "scheduled to arrive by June 5 (Tuesday)."

For example, when a delivery period required when a user purchases an item that is a target about which information is to be transmitted is before a specific reference point such as the day of or the day after purchase, the information on the delivery guarantee period of the item may be confirmed as information in the form of an icon including text such as "today" and "tomorrow." On the other hand, when a delivery period required when a user purchases an item that is a target about which information is to be transmitted is after a specific reference point such as the day or the day after purchase, the information on the delivery guarantee period of the item may be confirmed as information in the form of text such as "June 5 (Tuesday)."

Additionally, the information on the delivery completion guarantee period of the item may indicate information on a direct time period in which delivery is available on a specific date in addition to indicating information on a specific date when delivery guarantee is available as described above.

For example, when a delivery period required when a user purchases an item that is a target about which information is to be transmitted is available within the afternoon of the day of purchase, the information on the delivery completion guarantee period of the item may be confirmed as text in the form of "guarantee to arrive this afternoon" or "guarantee to arrive in the afternoon of the same day."

For example, when a delivery period required when a user purchases an item that is a target about which information is to be transmitted is available until the dawn of the next day, the information on the delivery guarantee period of the item may be confirmed as text in the form of "guaranteed to arrive by tomorrow dawn."

As an example, when a delivery period required when a user purchases an item to which information is to be delivered is available by Tuesday morning, June 5, the information on the delivery guarantee period of the item may be confirmed as text in the form of "guaranteed to arrive by the morning of June 5 (Tuesday)" or "scheduled to arrive by the morning of June 5 (Tuesday)."

For example, when a delivery period required when a user purchases an item that is a target about which information is to be transmitted is before a specific reference point such as the morning time on the day of purchase or the dawn of the next day and is a certain time period, the information on the delivery guarantee period of the item may be confirmed as information in the form of an icon including text such as "this afternoon" and "tomorrow dawn." On the other hand, when a delivery period required when a user purchases an item that is a target about which information is to be transmitted is after a specific reference point such as the day or the day after purchase, the information on the delivery guarantee period of the item may be confirmed as information in the form of text such as "June 5 (Tuesday)."

The operation of the server device 100 to confirm the characteristic information on or regarding the item according to operation 305 may further include confirming information according to example embodiments described below.

For example, when the server device 100 confirms at least a part of the text on the selected one review for the specific item as the representative review information, the server device 100 may confirm information on the time when the selected one review is written.

For example, when the server device 100 confirms the information on the time when the selected one review is actually written, the server device 100 may confirm information on a difference between the time when the user is currently accessing the user device 200 and the time when the selected one review is actually written.

For example, the information on the difference between the time when the user is currently accessing the user device 200 and the time when the selected one review is actually written may include text such as "written one hour ago," "written one week ago," and/or "written two months ago." Here, the information for indicating the time difference is not limited to the above-described text content or text form and may include other phrase content or various other forms that may indicate the time difference.

In this case, it is obvious that the above-described various pieces of information additionally confirmed by the server device 100 in addition to the characteristic information on the item in operation 305 may be combined in various forms and confirmed together by the server device 100.

According to various example embodiments, in operation 307, the server device 100 may provide the item list information for one or more items including the confirmed characteristic information on the item and the representative review information.

For example, the characteristic information on the item may include some or all of the various pieces of information described in the embodiment of operation 305.

For example, the representative review information may include a title of one review confirmed according to the embodiment of operation 305. That is, among reviews in which a title is listed of at least some of the reviews, a title of a review corresponding to a high ranking by a plurality of users may be a target of information provision.

For example, a text length of the provided review title may be preset and may be configured differently according to hardware and software setting conditions of the server device 100 or the user device 200.

For example, when the text length of the provided review title is preset, some text corresponding to the preset text length may be output.

For example, when providing the representative review information, the server device 100 may also provide rating information on an item included in the selected one review corresponding to the representative review.

The operation of the server device 100 to provide the item list information according to operation 307 may further include providing information according to example embodiments described below.

For example, the server device 100 may additionally provide information related to sales of an item in addition to the provided information on the list of items. Here, the information related to the sales of the item may include: 1) information that allows the user to know the sales status or situation of the item or users' preference or purchase frequency, 2) additional information that users are to be aware of for the users to purchase an item, and/or 3) recommendation information or the like based on an algorithm that reflects the purchase characteristics of each user.

Specifically, when it is determined that an item that is a target about which information is to be transmitted shows a good sales status or situation due to a high purchase rate of users compared to other items for a certain period of time, or when a sales volume has increased sharply for a certain period of time, the server device 100 may additionally provide information indicating the high purchase rate of the item. In this case, the server device 100 may additionally provide information indicating the high purchase rate of the item.

As an example, a certain period of time that is the basis for determining the purchase rate may be a preset period, such as a week, a month, or a quarter.

As an example, the information indicating the high purchase rate of the item may be provided as text such as "popular product" or "popular lately."

As an example, when it is determined that an item has the highest purchase rate and shows the best sales status or situation among items to which the item that is a target about which information is to be transmitted belongs, the information indicating the high purchase rate of the item may be provided as text such as "best seller" or "No. 1 in sales." In this case, a determination as to whether the item has the highest purchase rate and shows the best sales status or sales status may be determined through an algorithm.

Here, various pieces of information provided for indicating that the item has a high purchase rate are not limited to the above-described phrase content or text form and may include other phrase content or various other forms that may indicate that the item has a high purchase rate or shows a sales situation.

Specifically, when there are matters to be additionally confirmed by a user in order to purchase an item that is a target about which information is to be transmitted, the server device 100 may additionally provide the information.

For example, when a user is to reserve an item in advance for the purchase of the item that is a target about which information is to be transmitted, additional information that users are to be aware of for the users to purchase items may be provided as text in the form of "advance reservation."

For example, when there is a possibility that the purchase of the item that is a target about which information is to be transmitted may be delayed due to delivery circumstances, the additional information that users are to be aware of for the users to purchase items may be provided as text in the form of the "delivery delay."

For example, when the purchase of the item that is a target about which information is to be transmitted is available on the day of sale, the information that users are to be aware of for the users to purchase items may be provided as text in the form of the "same day delivery closed."

Here, various pieces of information for indicating matters that the user is to additionally confirm for the user to purchase the items is not limited to the above-described phrase content or text form and may include other phrase content or various other forms that may indicate additional guidance.

Specifically, when it is determined that the item being checked by the user is suitable by comparing with the existing purchase history characteristics of the user, the server device 100 may additionally provide information notifying that the item is an item that may be recommended according to the purchase characteristics of the user.

For example, when the purchase rate for the item by other users with purchase history characteristics similar to the existing purchase history characteristics of the user is high, the information notifying that the item is the item that may be recommended according to the purchase characteristics of the user may be provided as text such as "customer suitability" or "algorithm recommendation."

In addition, various pieces of information provided by the server device 100 in addition to the characteristic information on the item may be displayed and provided in a simple form on a portion above the display indicating information indicating the characteristics of the item.

For example, texts such as "popular product," "popular lately," "best seller," "No. 1 in sales," "advance reservation," "delivery delay," "same day delivery closed," "customer suitability," or "algorithm recommendation" may be displayed and provided on a portion on the display indicating information indicating the characteristics of the item in the form of a badge or an icon. Here, the display indicating various pieces of information related to the sale of the item acquired in addition to the characteristic information on the item is not limited to the form of the badge or icon, and other types of display that may transmit the same content may be available.

The operation of the server device 100 to provide the item list information according to operation 307 may further include providing information according to example embodiments described below.

For example, the server device 100 may additionally provide the information on or regarding the item purchase history of the user in addition to the provided characteristic information on the item.

Specifically, when a user has purchased an item, that is a target about which information is to be transmitted, more than once, the server device 100 may additionally provide the information indicating the purchase history of the item.

For example, when a user has a history of purchasing the item once, the information indicating the purchase history of the item may be confirmed as text such as "product purchased once," when a user has a history of purchasing the item twice, the information indicating the purchase history of the item may be confirmed as text such as "product purchased twice," and when a user has a history of purchasing the item three or more times, the information indicating the purchase history of the item may be provided as text such as "frequently purchased product," Here, the display of the "frequently purchased product" is not text configured only when a user has a history of purchasing the item three or more times, but may be text based on a predetermined number of purchases. In this case, the specific number of times may also include the number of purchases, such as once or twice, described above. In addition, the number of times the "frequently purchased product" is purchased may be counted by determining whether the same item has been repeatedly purchased based on an item identifier. Here, the item identifier is assigned to differentiate items, and even when items are sold by other sellers in a service managed by the server device 100, the same kind of items may be assigned the same item identifier.

As an example, the number of times a user has purchased an item may be counted for a specific period, and the specific period may be a preset period such as one month, a quarter, a half term, and one year.

In addition, various pieces of information indicating the purchase history of the item provided by the server device 100 in addition to the information on the list of items may be displayed and provided in a simple form together with the display indicating the information indicating the characteristics of the item.

For example, texts such as "product purchased once," "product purchased twice," and "frequently purchased product" according to each of the above-described situations may be displayed and provided in the form of the badge or icon along with the information indicating the characteristics of the item. Here, the display indicating various pieces of information indicating the purchase history of the item acquired in addition to the characteristic information on the item is not limited to the form of the badge or icon, and other types of display that may transmit the same content may be available.

The operation of the server device 100 to provide the item list information according to operation 307 may further include providing information according to example embodiments described below.

For example, the server device 100 may additionally provide the information on the delivery guarantee period of the item in addition to the provided characteristic information on the item.

Specifically, when it is possible to deliver an item that is a target about which information is to be transmitted to a user within a specific period, the server device 100 may additionally provide the information on the delivery guarantee period of the item.

For example, when a delivery period required when a user actually purchases an item that is a target about which information is to be transmitted is available within the day of purchase, the information on the delivery guarantee period of the item may be provided as text in the form of "guaranteed to arrive today", "guaranteed for same day delivery", "scheduled to arrive today", or "scheduled for same day delivery."

For example, when a delivery period required when a user actually purchases an item that is a target about which information is to be transmitted is available until the day after purchase, the information on the delivery guarantee period of the item may be provided as text in the form of "guaranteed to arrive tomorrow" or "scheduled to arrive tomorrow."

For example, when a delivery period required when a user actually purchases an item to which information is to be delivered is available until Tuesday, June 5, the information on the delivery guarantee period of the item may be provided as text in the form of "guaranteed to arrive on June 5 (Tuesday)" or "scheduled to arrive on June 5 (Tuesday)."

For example, when a delivery period required when a user actually purchases an item that is a target about which information is to be transmitted is before a specific reference point such as the same day or the day after purchase, the information on the delivery guarantee period of the item may be provided as information in the form of an icon including text such as "today" and "tomorrow." On the other hand, when a delivery period required when a user actually purchases an item that is a target about which information is to be transmitted is after a specific reference point such as the same day or the day after purchase, the information on the delivery guarantee period of the item may be provided as information in the form of text such as "June 5 (Tuesday)."

Additionally, the information on the delivery guarantee period of the item may indicate information on a direct time period in which delivery is available on a specific date in addition to indicating information on a specific date when delivery guarantee is available as described above.

For example, when a delivery period required when a user actually purchases an item that is a target about which information is to be transmitted is available within the afternoon of the day of purchase, the information on the delivery guarantee period of the item may be provided as text in the form of "guaranteed to arrive this afternoon" or "guaranteed to arrive in the afternoon of the same day."

For example, when a delivery period required when a user actually purchases an item that is a target about which information is to be transmitted is available until the dawn of the next day, the information on the delivery guarantee period of the item may be provided as text in the form of "guaranteed to arrive tomorrow dawn."

As an example, when a delivery period required when a user actually purchases an item to which information is to be delivered is available until Tuesday morning, June 5, the information on the delivery guarantee period of the item may be provided as text in the form of "guaranteed to arrive by the morning of June 5 (Tuesday)" or "scheduled to arrive by the morning of June 5 (Tuesday)."

For example, when a delivery period required when a user actually purchases an item that is a target about which information is to be transmitted is before a specific reference point such as the morning time on the day of purchase or the dawn of the next day and is a certain time period, the information on the delivery guarantee period of the item may be provided as information in the form of an icon including text such as "this afternoon" and "tomorrow dawn." On the other hand, when a delivery period required when a user actually purchases an item that is a target about which information is to be transmitted is after a specific reference point such as the same day or the day after purchase, the information on the delivery guarantee period of the item may be provided as information in the form of text such as "June 5 (Tuesday)."

In addition, various pieces of information indicating the delivery guarantee period of the item provided by the server device 100 in addition to the characteristic information on or regarding the item may be displayed and provided in a simple form together with the display indicating the information indicating the characteristics of the item.

For example, according to each situation described above, texts such as "guaranteed to arrive today," "guaranteed for same day delivery," "scheduled to arrive today," "scheduled for same day delivery," "guaranteed to arrive tomorrow," "scheduled to arrive tomorrow," "guaranteed to arrive on June 5 (Tuesday)," "scheduled to arrive on June 5 (Tuesday)," "guaranteed to arrive this afternoon," "guaranteed to arrive in the afternoon of the same day," "guaranteed to arrive by tomorrow dawn," "guaranteed to arrive by the morning of June 5 (Tuesday)," or "scheduled to arrive by the morning of June 5 (Tuesday)" may be displayed and provided as the patterned form together with the display indicating the information indicating the characteristics of the item. Here, the display indicating various pieces of information indicating the delivery guarantee period of the item acquired in addition to the characteristic information on the item is not limited to the patterned form, and other types of display that may transmit the same content may also be available.

The operation of the server device 100 to provide the item list information according to operation 307 may further include providing information according to example embodiments described below.

For example, when the server device 100 provides at least a part of the text on the selected one review for the specific item as the representative review information, the server device 100 may provide information on the time when the selected one review is actually written.

For example, when the server device 100 provides the information on the time when the selected one review is actually written, the server device 100 may provide information on a difference between the time when the user is currently accessing the user device 200 and the time when the selected one review is actually written.

For example, the information on the difference between the time when the user is currently accessing the user device 200 and the time when the selected one review is actually written may include text such as "written one hour ago," "written one week ago," and/or "written two months ago." In this case, the text as described above may be displayed and provided on a lower end portion or a side portion of the display indicating the representative review information. Here, the information for indicating the time difference is not limited to the above-described text content or text form and may include other phrase content or various other forms that may indicate the time difference.

In this case, it is obvious that the above-described various pieces of information additionally provided by the server device 100 in addition to the characteristic information on the item according to operation 307 may be combined in various forms and provided together through the server device 100. In addition, the position and order in which each piece of information is provided may be fixed regardless of whether the above-described various pieces of information are additionally provided in addition to the characteristic information on the item.

Meanwhile, in an example embodiment, the server device 100 may provide a user with a combination of at least some of the confirmed information.

FIGS. 4 to 8 are diagrams illustrating examples of user interface/user experience (UI/UX) for providing item information according to various example embodiments. For example, the examples of FIGS. 4 to 8 may be the UI/UX for the user device 200, and each of the example embodiments described in the accompanying drawings, and each of the example embodiments described in the accompanying drawings may be performed based on the operation of the server device 100 described above in FIG. 3.

Specifically, in each example embodiments of the UI/UX for the user device 200 described in the accompanying drawings, when the user device 200 receives input information from a user and transmits the received input information to the server device 100, the server device 100 may be performed in the form of providing the item information corresponding to the input information to the user device 200 based on the operations described above in FIG. 3 and then outputting the item information to the user device 200. However, each example embodiment of the UI/UX described in the accompanying drawings is not limited to such a form, and may be performed in any form capable of implementing each example embodiment of the UI/UX.

Figure 4:
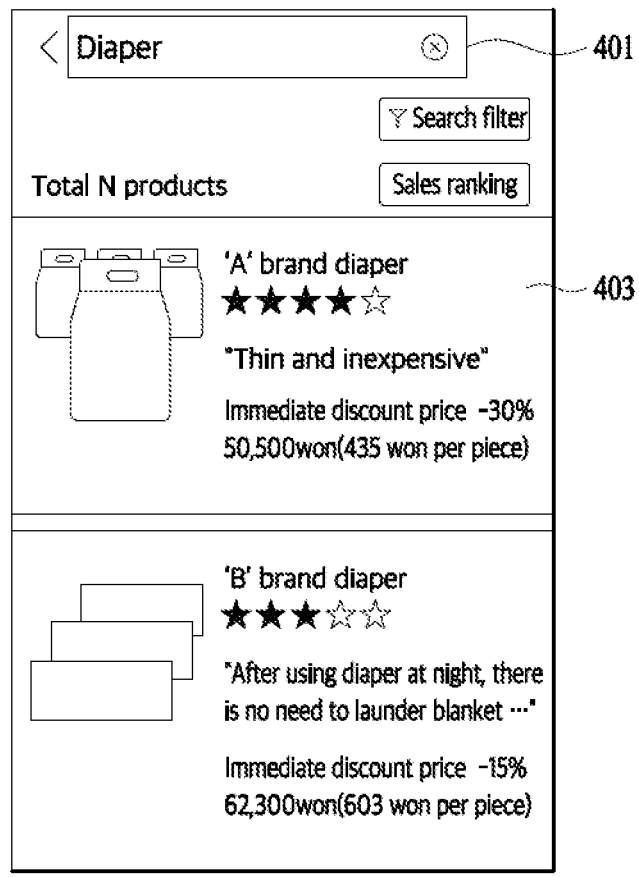
FIG. 4 is a diagram illustrating an example in which a user device 200 outputs characteristic information on an item and a title of a representative review to a user according to various example embodiments.
Figure 4:
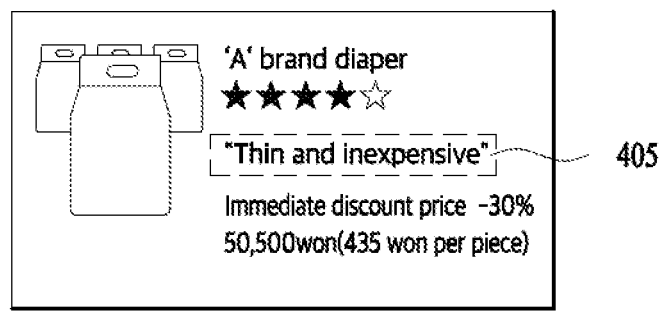

FIG. 4 is a diagram illustrating an example in which the user device 200 outputs the characteristic information on the item and the title of the representative review to the user based on the operation of the server device 100. Referring to (a) of FIG. 4, when the user inputs a keyword into a search area 401, a plurality of items corresponding to the keyword may be output on an item list display area 403.

(b) of FIG. 4 illustrates the information on one item provided in the item list display area 403. In (b) of FIG. 4, the user device 200 may output the title 405 of the representative review selected for the corresponding item to the user as the representative review information together with the characteristic information on the item.

For example, the user device 200 may output the information on the purchase characteristics of the item, such as a name, an image, a use, a price, a discount rate, and/or return availability of the item, as the characteristic information on the item.

For example, the text length of the review title that the user device 200 outputs may be preset and may be configured differently according to hardware and software setting conditions of the user device 200.

For example, when the text length of the review title that the user device 200 outputs is preset, partial text corresponding to the preset text length may be output.

For example, the number of review titles output may be preset and may be configured differently according to the hardware and software setting conditions of the user device 200. Although the number of review titles provided in (b) of FIG. 4 is illustrated as one, the number of review titles provided by the user device 200 through the representative review display area 405 is not limited to one, and titles of a plurality of reviews may be output according to the UI/UX configuration or the physical and functional conditions of the user device 200.

Figure 5:
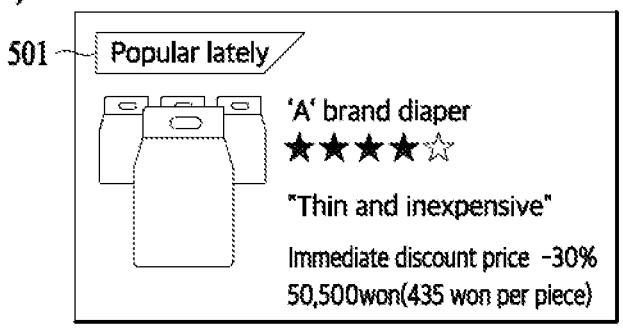
FIG. 5 is a diagram illustrating an example in which the user device 200 additionally outputs information related to item sales to a user in addition to the characteristic information on the item according to various example embodiments.
Figure 5:
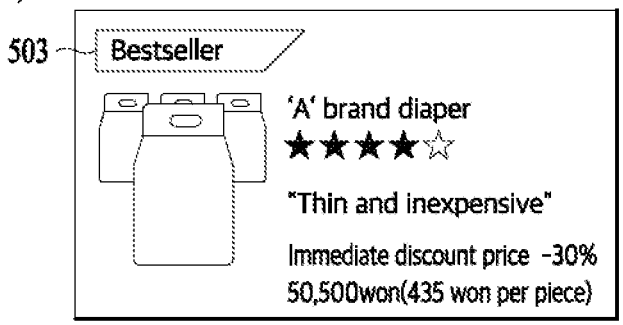
Figure 5:
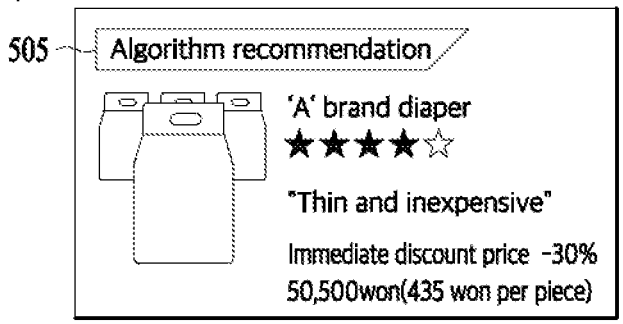

FIG. 5 is a diagram illustrating an example in which the user device 200 additionally outputs information related to a sale of an item to a user in addition to the characteristic information on the item based on the operation of the server device 100.

Referring to (a) of FIG. 5, the user device 200 may additionally output information on whether the searched item has a high purchase rate and shows a good sales status or situation to a user. In (a) of FIG. 5, it may be appreciated that the user device 200 may additionally provide information in the form of a badge or icon including the text "popular lately" to an upper part of the characteristic information on the item to additionally output the information related to the sale of the item as indicated by reference numeral 501.

Referring to (b) of FIG. 5, the user device 200 may additionally output information on whether the searched item has a highest purchase rate and shows the best sales status or situation to a user. In (b) of FIG. 5, it may be appreciated that the user device 200 may additionally provide the information in the form of a badge or icon 503 including the text "best seller" to the upper part of the characteristic information on the item to additionally output the information related to the sale of the item.

Here, the information output for indicating that the item has a high purchase rate is not limited to the phrase content or text form as shown in (a) and (b) of FIG. 5 and may include other phrase content or various other forms that may indicate that the item has the high purchase rate or shows the sales situation.

Meanwhile, referring to (c) of FIG. 5, the user device 200 may additionally output, to the user, the information notifying that the searched item is an item that may be recommended according to the purchase characteristic of the user. In (c) of FIG. 5, it may be appreciated that the user device 200 may additionally provide the information in the form of a badge or icon 505 including the text "algorithm recommendation" to the upper part of the characteristic information on the item to additionally output the information related to the sale of the item.

Here, the information output to indicate that the searched item is an item that may be recommended according to the purchase characteristics of the user is not limited to the text content or output format as shown in (c) of FIG. 5 and may include other phrase content or various forms that may indicate that the searched item is an item that may be recommended according to the purchase characteristics of the user.

Figure 6:
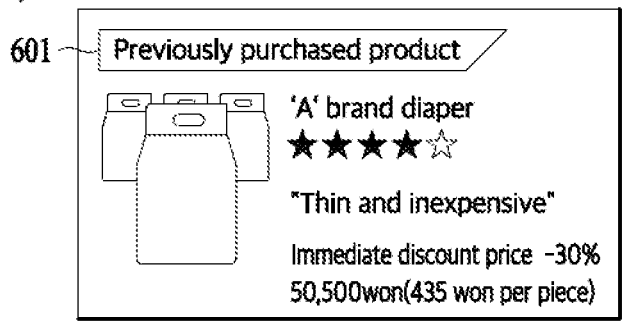
FIG. 6 is a diagram illustrating an example in which the user device 200 additionally outputs information on a purchase history of a user for an item to a user in addition to the characteristic information on the item according to various example embodiments.
Figure 6:
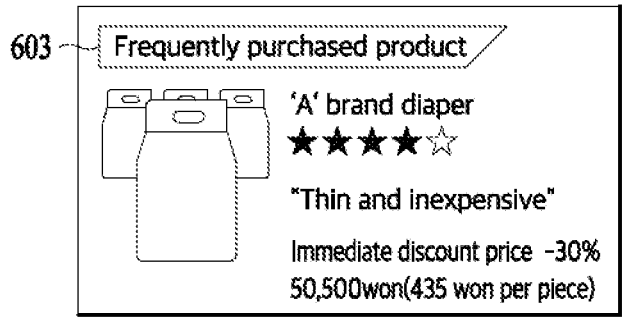

FIG. 6 is a diagram illustrating an example in which the user device 200 additionally outputs, to the user, the information on the purchase history of the user for the item in addition to the characteristic information on the item based on the operation of the server device 100.

Referring to (a) of FIG. 6, the user device 200 may additionally output, to the user, the information for notifying that the searched item is the item that the user has purchased. In (a) of FIG. 6, it may be appreciated that the user device 200 may additionally provide the information in the form of a badge or icon 601 including the text "purchased product" to the upper part of the characteristic information on the item to additionally output the information on the purchase history of the user for the item.

Referring to (b) of FIG. 6, the user device 200 may additionally output, to the user, information for notifying that the searched item is an item that has been purchased a certain number of times or more within a certain period of time. In (b) of FIG. 6, it may be appreciated that the user device 200 may additionally provide the information in the form of a badge or icon 603 including the text "frequently purchased product" to the upper part of the characteristic information on the item to additionally output the information on the purchase history of the user for the item.

Here, the information for notifying that the searched item is an item that the user has purchased is not limited to the phrase content or the provision form as illustrated in (a) or (b) of FIG. 6 and may include other phrase content or various other forms that may indicate that the searched item is the item that the user has purchased.

Figure 7:
FIG. 7 is a diagram illustrating an example in which the user device 200 additionally outputs information on a delivery guarantee period of an item to a user in addition to the characteristic information on the item according to various example embodiments.
Figure 7:
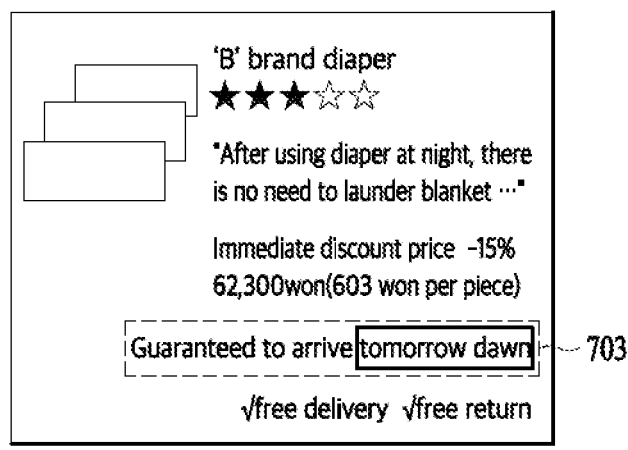
Figure 7:
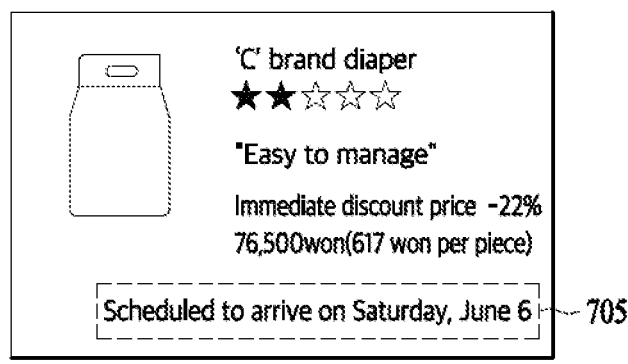

FIG. 7 is a diagram illustrating an example in which the user device 200 additionally outputs the information on the delivery guarantee period of the item to the user in addition to the characteristic information on the item based on the operation of the server device 100.

Referring to (a) of FIG. 7, when the user purchases the searched item at the present time, the user device 200 may additionally output, to the user, the information for notifying that delivery is available within today. In (a) of FIG. 7, it may be appreciated that the user device 200 may additionally output information 701 including the text "guaranteed to arrive today" to a lower part of the characteristic information of the item and additionally output information for indicating that delivery is available on the same day. In this case, it may be appreciated that the text "today" is composed in the form of a badge or icon to highlight that delivery is available by the same day.

Referring to (b) of FIG. 7, when the user purchases the searched item at the present time, the user device 200 may additionally output, to the user, the information for notifying that delivery is available by tomorrow dawn. In (b) of FIG. 7, it may be appreciated that the user device 200 may additionally output information 703 including the text "guaranteed to arrive by tomorrow dawn" to a lower part of the characteristic information of the item, and additionally output information for indicating that delivery is available by tomorrow dawn. In this case, it may be appreciated that the text "tomorrow dawn" is composed in the form of a badge or icon to highlight that delivery is available by tomorrow dawn.

Referring to (c) of FIG. 7, when the user purchases the searched item at the present time, the user device 200 may additionally output, to the user, the information for notifying that delivery is available by a specific fixed date. In (c) of FIG. 7, it may be appreciated that the user device 200 may additionally provide information 705 including the text "scheduled to arrive on Saturday 6 June" to the lower part of the characteristic information of the item, and additionally output information for indicating that delivery is available on a specific date.

Here, the information on the delivery guarantee period of the item is not limited to the phrase content or the output form as illustrated in (a) to (c) of FIG. 7 and may include other phrase content or various other forms that may indicate that delivery is available until a specific date.

Figure 8:
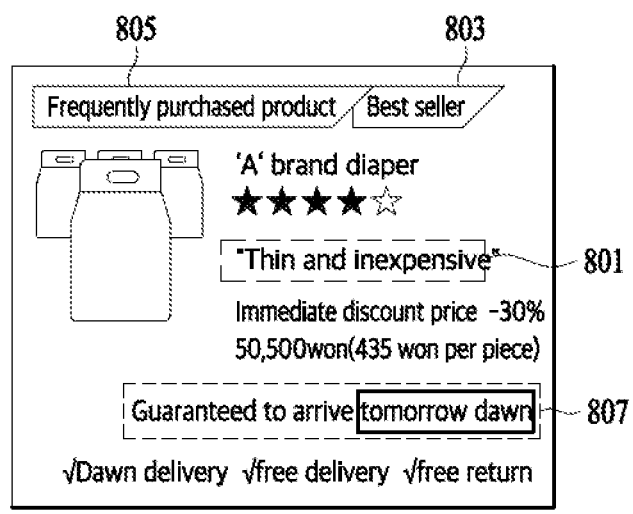
FIG. 8 is a diagram illustrating an example in which the user device 200 comprehensively outputs various pieces of information described in the embodiments of FIGS. 4 to 7 to a user according to various example embodiments.

FIG. 8 is a diagram illustrating an example in which the user device 200 comprehensively outputs various pieces of information described in the embodiments of FIGS. 4 to 7 to the user based on the operation of the server device 100. In FIG. 8, the user device 200 may output the title 801 of the selected representative review to the user together with the characteristic information on or regarding the item and may additionally output the information for indicating that the searched item has the highest purchase rate and shows the best sales status or situation in the form of the badge or icon 803 of the "best seller". The user device 200 may output the title 801 of the selected representative review to the user together with the characteristic information on the item and additionally output the information for notifying that the searched item is the item that the user has purchased a specific number of times or more within a certain period of time in the form of a badge or an icon 805 of the "frequently purchased item." The user device 200 may output, to the user, the title 801 of the selected representative review together with the characteristic information on the item and additionally output the information 807 for notifying that the searched item may be delivered tomorrow dawn.

The UI/UX for the user device 200 of FIGS. 4 to 8 and the operation of the user device 200 may be performed in relation to the operation of the server device 100 described above in FIG. 3, and the example of the UI/UX of FIGS. 4 to 8 is one example for the disclosure of the present disclosure, and therefore, various example embodiments of the present disclosure are not limited to the UI/UX form of FIGS. 4 to 8 and may be performed according to all types of UI/UX that may implement various example embodiments of the present disclosure.

The example embodiments of the present disclosure disclosed in the present specification and drawings are merely providing specific examples to easily explain the technical content of the present disclosure and to aid in understanding of the present disclosure and are not intended to limit the scope of the present disclosure. That is, it is obvious to those of ordinary skill in the art to which the present disclosure pertains that other modifications based on the technical idea of the present disclosure may be implemented. In addition, each of the above-described embodiments may be combined and operated as necessary. For example, parts of all embodiments of the present disclosure may be combined with each other and implemented by a system.

In addition, the methods according to the present disclosure may be implemented in a form of program commands that may be executed through various computer means and may be recorded in a computer readable recording medium.

As described above, various example embodiments of the present disclosure may be implemented as computer readable code in the computer readable recording medium from a specific point of view. The computer readable recording medium is any data storage device capable of storing data that may be read by a computer system. Examples of the computer readable recording media may include a ROM, a RAM, a CD-ROM, magnetic tapes, floppy disks, optical data storage devices, and carrier waves (such as data transmission through the Internet). The computer readable recording medium may also be distributed through networked computer systems, and thus the computer readable code is stored and executed in a distributed manner. In addition, functional programs, codes, and code segments for achieving various example embodiments of the present disclosure may be easily interpreted by skilled programmers in the field to which the present disclosure is applied.

In addition, it will be appreciated that the apparatus and method according to various example embodiments of the present disclosure may be realized in the form of hardware, software, or a combination of the hardware and software. For example, the software may be stored in a non-volatile storage such as a USB memory device, a memory such as a RAM, a ROM, a flash memory, a memory chip, or an integrated circuit, or a storage medium optically or magnetically readable by a machine (for example, a computer), such as a compact disk (CD), a digital versatile disk (DVD), a magnetic disk, a magnetic tape, or the like, regardless of whether data is erasable or rewritable. It may be appreciated that the method according to various example embodiments of the present disclosure may be implemented as a computer including a controller and a memory, a vehicle including such a memory or a computer, or the like, and such a memory is an example of a program including instructions that implement the example embodiments of the present disclosure or a machine readable storage medium suitable for storing programs.

Accordingly, the present disclosure includes a program including a code for implementing the apparatus or method described in the claims of the present specification, and a storage medium readable with a machine (such as a computer) for storing such a program. Further, such a program may be transferred electronically through any medium, such as a communication signal transmitted through a wired or wireless connection, and the present disclosure suitably includes equivalents thereto.

Although the present disclosure is described with reference to the example embodiments of the present disclosure, the example embodiments of the present disclosure disclosed in this specification and drawings provide specific examples to easily explain the technical content of the present disclosure and to help understanding the present disclosure and are not intended to limit the scope of the present disclosure. In addition, the example embodiments according to the present disclosure described above are merely exemplary, and those of ordinary skill in the art will understand that various modifications and equivalent ranges of embodiments are possible therefrom. Therefore, the true technical protection scope of the present disclosure should be determined by the following claims.

What is claimed is:

1. A method of providing item information by an electronic apparatus, the electronic apparatus comprising a communicator and a processor, the method comprising:
   acquiring, via the processor, keyword information from a user;
   determining, via the processor, one or more items corresponding to the keyword information, the one or more items including a first item;
   obtaining, via the processor, characteristic information regarding the first item and information regarding item category in which the first item is included;
   determining, via the processor, a value obtained by averaging a number of reviews for a plurality of items included in the item category;
   obtaining, via the processor, information regarding at least some reviews in which a title is listed among one or more reviews of the first item;
   determining, via the processor, that a number of the one or more reviews of the first item having titles is equal to or greater than the average number of reviews for the plurality of items included in the item category;
   in response to determining that the number of the one or more reviews of the first item having titles is equal to or greater than the average number of reviews for the plurality of items included in the item category, selecting, via the processor, information on a first review of the first item among the at least some reviews, the selected information on first review including a title text of the first review;
   adjusting, via the processor, a length of the title text of the first review to be displayed on a user device based on hardware setting conditions of the user device; and
   transmitting, via the communicator, item list information for the one or more items including the characteristic information and the information on the first review including the adjusted length title text to the user device.

2. The method of claim 1, wherein:
the information on the first review includes a title text of the selected one review; and
the selected one review is a review with a highest ranking among the at least some reviews.

3. The method of claim 1, wherein:
the selected one review is a review included in a review set selected from the one or more reviews, and
the selected review set is determined based on evaluation and a number of clicks for the one or more reviews by a plurality of users.

4. The method of claim 1, further comprising:
confirming that an item corresponds to a specific attribute among the one or more items,
wherein the item list information includes an icon for indicating the specific attribute displayed at a location related to the item corresponding to the specific attribute.

5. The method of claim 4, wherein the specific attribute includes an attribute in which the item corresponding to the specific attribute is recommended for the user according to a purchase history of the user.

6. The method of claim 4, wherein the specific attribute includes an attribute in which a corresponding item has a high purchase rate among the one or more items.

7. The method of claim 4, wherein the specific attribute includes an attribute in which a corresponding item has a highest purchase rate among the one or more items.

8. The method of claim 4, wherein the specific attribute includes an attribute in which a corresponding item is purchasable when reserved by the user in advance.

9. The method of claim 1, further comprising:
confirming an item with a purchase history of the user among the one or more items,
wherein the item list information includes an icon for indicating the purchase history displayed at a location related to the item with the purchase history.

10. The method of claim 9, wherein the purchase history:
indicates that the user has a purchase history of once or twice when a corresponding item is an item purchased once or twice by the user; and
indicates that there is a repeated purchase history by the user when a corresponding item is an item that the user has purchased three or more times.

11. The method of claim 1, wherein:
the characteristic information includes information on a delivery completion deadline of the first item; and
the information on the delivery completion deadline is:
displayed as an icon when the delivery completion deadline is before a reference time point, and
displayed as a text when the delivery completion deadline is after the reference time point.

12. The method of claim 11, wherein the reference time point within one day from a purchase date of the first item.

13. The method of claim 11, wherein:
the information on the delivery completion deadline includes information on a time period in which the delivery of the first item can be completed, and
the information on the time period in which the delivery can be complete is displayed by being included in the icon based on the delivery completion deadline being before the reference time point.

14. The method of claim 1, wherein the information on the first review includes rating information regarding the first item.

15. An electronic apparatus for providing item information, the electronic apparatus comprising:
a processor;
a communicator; and
one or more memories that store one or more instructions, wherein, when the one or more instructions are executed, the processor controls to perform:
acquiring, from a user, keyword information;
determining one or more items corresponding to the keyword information, the one or more items including a first item;
obtaining characteristic information regarding the first item and information regarding item category in which the first item is included;
determining a value obtained by averaging a number of reviews for a plurality of items included in the item category;
obtaining information regarding at least some reviews in which a title is listed among one or more reviews of the first item;
determining that a number of the one or more reviews of the first item having titles is equal to or greater than the average number of reviews for the plurality of items included in the item category;
in response to determining that the number of the one or more reviews of the first item having titles is equal to or greater than the average number of reviews for the plurality of items included in the item category, selecting information on a first review of the first item among the at least some reviews, the selected information on first review including a title text of the first review;
adjusting a length of the title text of the first review to be displayed on a user device based on hardware setting conditions of the user device; and
transmitting, via the communicator, item list information for the one or more items including the characteristic information and the information on the first review including the adjusted length title text to the user device.

16. The method of claim 1, further comprising:
obtaining a purchase history of the user for the first item, the item list information including an icon for indicating the purchase history displayed at a location related to the first item,
wherein the icon for indicating the purchase history is configured differently based on a number of purchases of the user for the first item.

* * * * *